US012510004B2

(12) United States Patent
Aviles Borja et al.

(10) Patent No.: US 12,510,004 B2
(45) Date of Patent: Dec. 30, 2025

(54) OUTWARD FACING LOAD REACTING BODIES FOR USE WITH UNISON RINGS

(71) Applicant: General Electric Company, Cincinnati, OH (US)

(72) Inventors: Socrates Aviles Borja, Queretaro (MX); Rodolfo Mena Dominguez, Queretaro (MX); Shawn Patrick Riley, Liberty Township, OH (US); Paul J. Trimby, Lynn, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/744,209

(22) Filed: Jun. 14, 2024

(65) Prior Publication Data

US 2025/0382897 A1 Dec. 18, 2025

(51) Int. Cl.
*F01D 17/16* (2006.01)
*F01D 25/24* (2006.01)

(52) U.S. Cl.
CPC ......... *F01D 25/246* (2013.01); *F01D 25/243* (2013.01); *F05D 2240/50* (2013.01)

(58) Field of Classification Search
CPC ...... F01D 17/16; F01D 17/162; F01D 17/165; F01D 17/167; F01D 25/28
See application file for complete search history.

(56) References Cited

U.S. PATENT DOCUMENTS

| | | | | |
|---|---|---|---|---|
| 5,048,286 | A | 9/1991 | Stransky et al. | |
| 5,054,286 | A * | 10/1991 | Stransky | F04D 27/0215 60/226.3 |
| 8,905,887 | B2 | 12/2014 | Coles | |
| 9,422,825 | B2 * | 8/2016 | Do | F01D 17/162 |
| 9,957,834 | B2 | 5/2018 | Wasserman et al. | |
| 10,184,350 | B2 | 1/2019 | Hall | |
| 10,590,794 | B2 * | 3/2020 | Sebrecht | F01D 17/162 |
| 10,612,413 | B2 | 4/2020 | Warren et al. | |
| 10,801,362 | B2 | 10/2020 | Hernandez et al. | |
| 11,022,047 | B2 | 6/2021 | Zsurka et al. | |
| 2012/0195751 | A1 * | 8/2012 | Gasmen | F02C 9/20 415/213.1 |
| 2023/0287800 | A1 * | 9/2023 | Cribley | F01D 17/162 |

* cited by examiner

*Primary Examiner* — Nathaniel E Wiehe
*Assistant Examiner* — Maxime M Adjagbe
(74) *Attorney, Agent, or Firm* — Hanley, Flight & Zimmerman, LLC

(57) ABSTRACT

Outward facing load reacting bodies for use with unison rings are disclosed. An example unison ring assembly comprises a unison ring surrounding a casing, the unison ring having an outer annular surface facing away from the casing, a bracket coupled to the casing, the bracket having an arm extending across the outer annular surface of the unison ring, the unison ring positioned between the arm and the casing, and an elongated body positioned at a circumferential position on the unison ring, a first portion of the elongated body coupled to the unison ring, a second portion of the elongated body extending away from the outer annular surface of the unison ring, the second portion having a curved surface to contact the arm.

20 Claims, 6 Drawing Sheets

OUTWARD FACING LOAD REACTING BODIES FOR USE WITH UNISON RINGS

FIELD OF THE DISCLOSURE

This disclosure relates generally to gas turbine engines and, more particularly, to outward facing load reacting bodies for use with unison rings.

BACKGROUND

Some gas turbine engines with variable stator vanes (VSV) include unison rings surrounding an engine casing and actuated by a linkage assembly associated with an actuator. Such an assembly enables movement of a plurality of stages of stator vanes responsive to controlled, changing engine conditions by way of crank arms connected to the unison ring for varying the angle of the vanes in each stage. The unison ring is mounted on carriers so that it is rotatable about its central axis which coincides with the engine axis. Gravity, assembly loads, or operating conditions of the engine can cause the unison ring to become decentralized around the engine casing.

Figure 1:
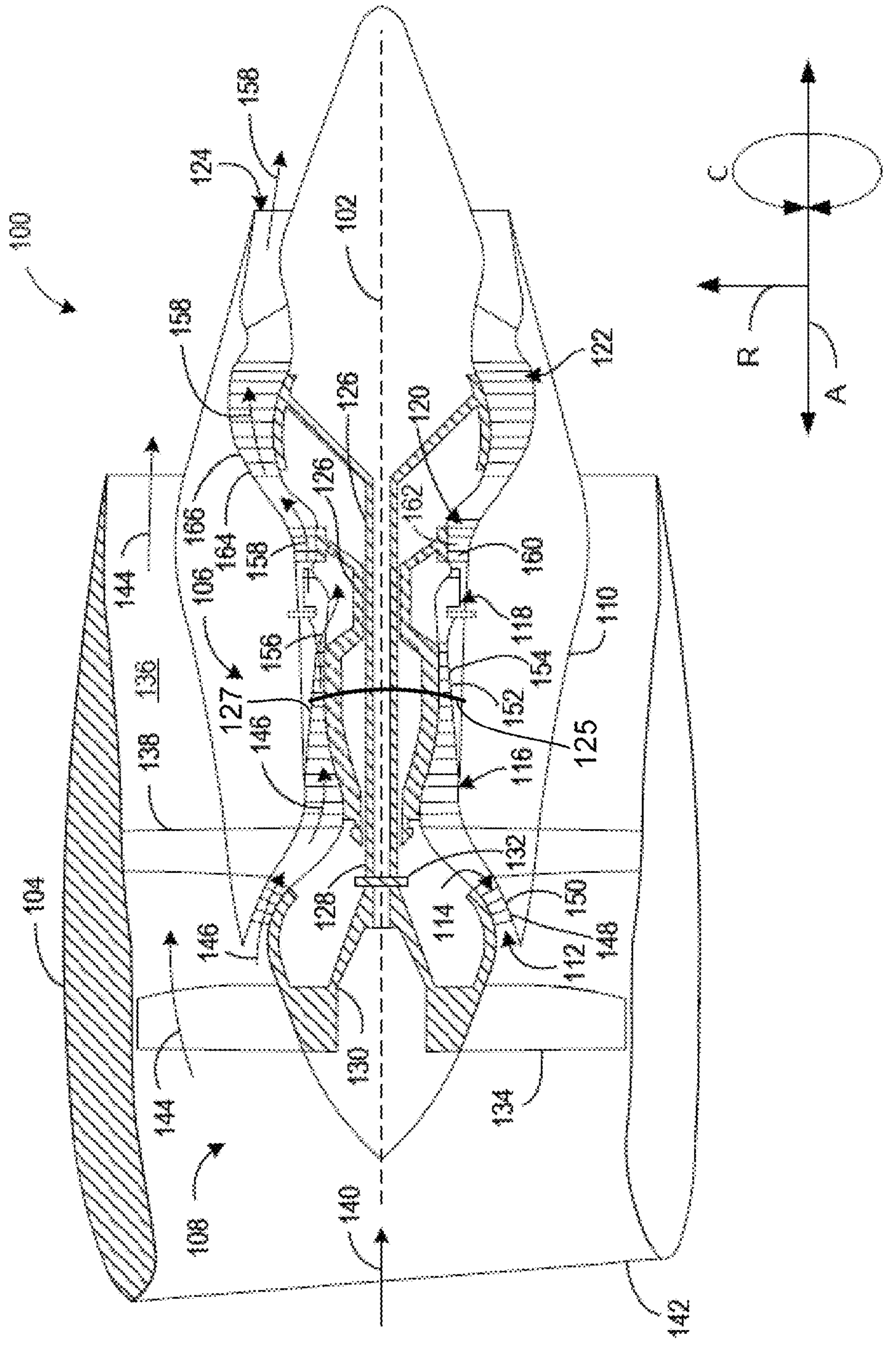
FIG. 1 is a schematic cross-sectional view of an example high-bypass turbofan-type gas turbine engine that can incorporate various examples disclosed herein.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this document, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

FIG. 1 is a schematic cross-sectional view of an example high-bypass turbofan-type gas turbine engine ("turbofan engine 100") that can incorporate various examples disclosed herein. While the illustrated example is a high-bypass turbofan engine, the principles of the present disclosure are also applicable to other types of engines, such as low-bypass turbofans, turbojets, turboprops, etc. The turbofan engine 100 includes an outer bypass duct 104 (which may also be referred to as a nacelle, fan duct, or outer casing), a gas turbine engine 106 (which may also be referred to as a core turbine engine or turbo-machinery), and a fan section 108. The gas turbine engine 106 and the fan section 108 are disposed at least partially in the outer bypass duct 104. The gas turbine engine 106 is disposed downstream from the fan section 108 and drives the fan section 108 to produce forward thrust. As shown in FIG. 1, the turbofan engine 100 or the gas turbine engine 106 define a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

The gas turbine engine 106 includes an approximately tubular outer casing 110 (which may also be referred to as a mid-casing) that defines an annular inlet 112. The outer casing 110 of the gas turbine engine 106 can be formed from a single casing or a plurality of casings. The outer casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124. Further, the outer casing 110 encloses an example unison ring 125 that surrounds an outer surface of a compressor casing 127. A high pressure shaft or spool 126 ("HP shaft 126") drivingly couples the HP turbine 120 and the HP compressor 116. A low pressure shaft or spool 128 ("LP shaft 128") drivingly couples the LP turbine 122 and the LP compressor 114. The LP shaft 128 may also couple to a fan spool or shaft 130 of the fan section 108. In some examples, the LP shaft 128 may couple directly to the fan shaft 130 (i.e., a direct-drive configuration). In alternative configurations, the LP shaft 128 may couple to the fan shaft 130 via a reduction gearbox 132 (i.e., an indirect-drive or geared-drive configuration).

As shown in FIG. 1, the fan section 108 includes a plurality of fan blades 134 coupled to and extending radially outwardly from the fan shaft 130. The outer bypass duct 104 circumferentially encloses the fan section 108 or at least a portion of the gas turbine engine 106. In particular, the gas turbine engine is disposed in the outer bypass duct 104 such that a bypass airflow passage or duct 136 is formed between the outer casing 110 of the gas turbine engine 106 and the outer bypass duct 104. The outer bypass duct 104 may be supported relative to the gas turbine engine 106 by a plurality of circumferentially-spaced apart outlet guide vanes 138.

As illustrated in FIG. 1, during operation of the turbofan engine 100, air 140 enters an inlet portion 142 of the turbofan engine 100. The air 140 is accelerated by the fan blades 134. A first portion 144 of the air 140 flows into the bypass airflow passage 136, while a second portion 146 of the air 140 flows into the inlet 112 of the gas turbine engine 106 (and, thus, into the LP compressor 114). One or more sequential stages of LP compressor stator vanes 148 and LP compressor rotor blades 150 coupled to the LP shaft 128 progressively compress the second portion 146 of the air 140 flowing through the LP compressor 114 en route to the HP compressor 116. Next, one or more sequential stages of HP compressor stator vanes 152 and HP compressor rotor blades 154 coupled to the HP shaft 126 further compress the second portion 146 of the air 140 flowing through the HP compressor 116. This provides compressed air 156 to the combustion section 118 where it mixes with fuel and burns to provide combustion gases 158.

The variable stator vanes 148, 152 (e.g., LP compressor stator vanes 148 and HP compressor stator vanes 152) are mounted to the compressor casing 127 and direct the second portion 146 of the air 140 at a desired angle into the rotor blades 150, 154. In some examples, the orientation or angular position of the variable stator vanes 148, 152 can ensure that the second portion 146 of the air 140 passes through the LP compressor 114 at this desired angle to promote smooth airflow and mitigate turbulence. In some examples, variable stator vane angle deviation can be caused by warpage or movement of the unison ring 125 during operation. Variable stator vane angle deviation alters the angular position of any one of or all of the variable stator vanes 148, 152, a phenomenon often referred to as "hysteresis." Typically, the desired angle of the second portion 146 of the air 140 can skew or disrupt variable stator vane angle deviation due to deflection of the unison ring 125, introducing needless turbulence in the turbofan engine 100.

To counteract radial deflection of the unison ring 125 and the subsequent variable stator vane angle deviation during operation, inward facing rub buttons (e.g., standoff pins) on the unison ring 125 maintain the positioning and alignment of the unison ring 125. For example, inward facing rub buttons extend from the unison ring 125 to a rubbing interface on the compressor casing 127 to push against radial movement of the unison ring. However, aircrafts and aircraft engines are ever increasing in size. With larger engines and larger compressors, operating loads can increase, which increases the likelihood that variable stator vanes (e.g., the variable stator vanes 148, 152) will deflect and warp. In some examples, smaller aircraft engines can also experience the high operating loads experienced by larger aircraft engines. Inward facing rub buttons may be effective in smaller aircraft engines (e.g., having a single-actuator system), but prove ineffective in larger aircraft engines (e.g., having a dual-actuator system).

Examples disclosed herein mitigate angle deviation associated with variable stator vanes in gas turbine engines. For example, disclosed examples provide outward facing load reacting bodies for use with an example unison ring that counteract loads on a compressor casing in an example gas turbine engine. For example, disclosed examples include external support structures (e.g., brackets) that provide outward radial constraints for the load reacting bodies. Further, disclosed examples can be positioned at any circumferential location on an example unison ring. As such, examples disclosed herein enable positional adjustment of the load reacting bodies on unison rings based on the design, shape, orientation, etc., of example compressor casings. Further, disclosed examples can be implemented in large gas turbine engines having dual-actuator systems and smaller gas turbine engines (e.g., having single actuator systems). Examples disclosed herein include a unison ring that surrounds an example compressor casing. However, examples disclosed herein may be implemented with unison rings that surround other structures in an example aircraft engine. For example, an example unison ring (e.g., including corresponding outward facing load reacting bodies, brackets, etc.) disclosed herein can surround an example fan casing, an example turbine, an example turbine frame, a compressor, etc.

The combustion gases 158 flow through the HP turbine 120 where one or more sequential stages of HP turbine stator vanes 160 and HP turbine rotor blades 162 coupled to the HP shaft 126 extract a first portion of kinetic or thermal energy therefrom. This energy extraction supports operation of the HP compressor 116. The combustion gases 158 then flow through the LP turbine 122 where one or more sequential stages of LP turbine stator vanes 164 and LP turbine rotor blades 166 coupled to the LP shaft 128 extract a second portion of thermal or kinetic energy therefrom. This energy extraction causes the LP shaft 128 to rotate, which supports operation of the LP compressor 114 or rotation of the fan shaft 130. The combustion gases 158 then exit the gas turbine engine 106 through the exhaust section 124 thereof. The combustion gases 158 mix with the first portion 144 of the air 140 from the bypass airflow passage 136 to produce propulsive thrust.

Along with the turbofan engine 100, the gas turbine engine 106 serves a similar purpose and sees a similar environment in land-based gas turbines, turbojet engines in which the ratio of the first portion 144 of the air 140 to the second portion 146 of the air 140 is less than that of a turbofan, and unducted fan engines in which the fan section 108 is devoid of the outer bypass duct 104. In each of the turbofan, turbojet, and unducted engines, a speed reduction device (e.g., the reduction gearbox 132) may be included between any shafts and spools. For example, the reduction gearbox 132 may be disposed between the LP shaft 128 and the fan shaft 130 of the fan section 108.

Figure 2B:
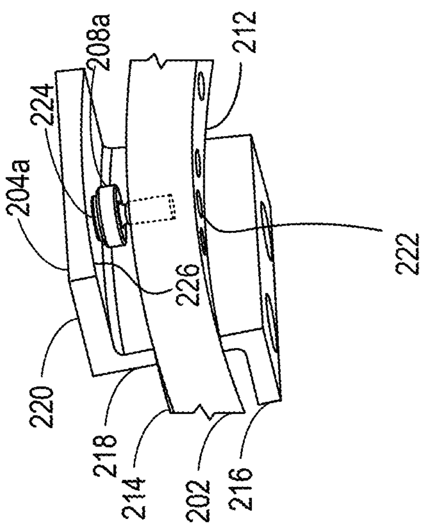
FIG. 2B is a detailed view of a portion of the first unison ring assembly of FIG. 2A.
Figure 2A:
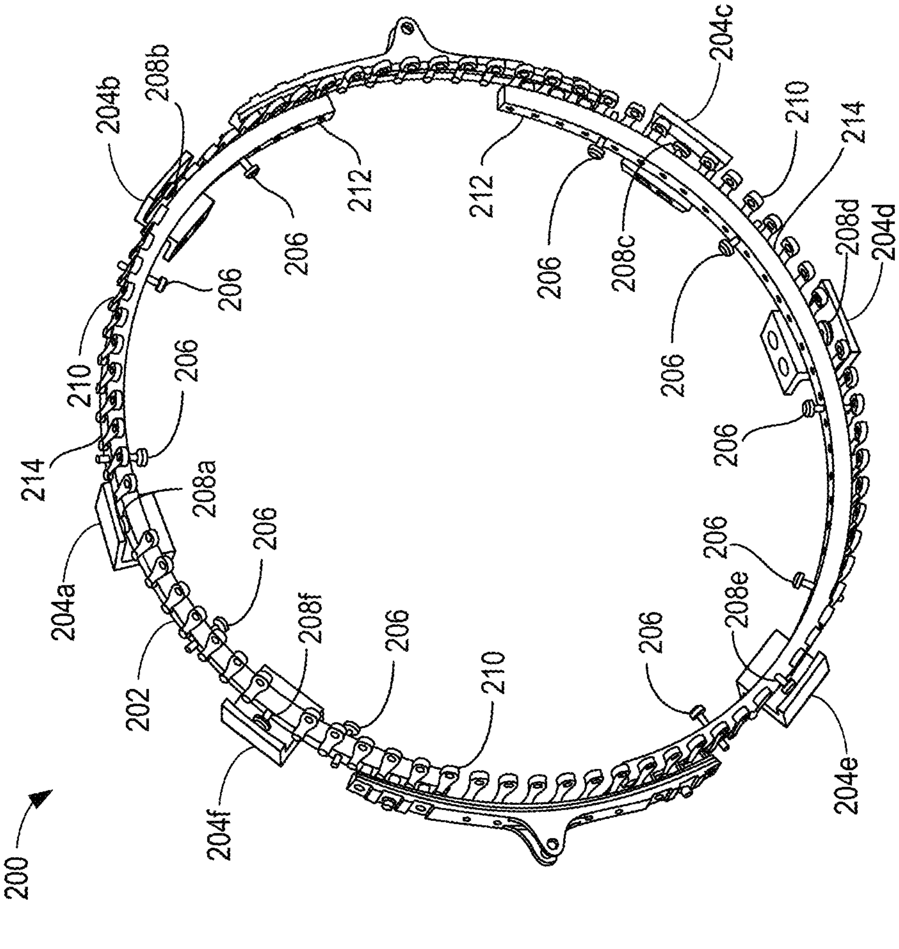
FIG. 2A is a first example unison ring assembly constructed in accordance with examples disclosed herein.

FIG. 2A illustrates an example first unison ring assembly 200 constructed in accordance with examples disclosed herein. In some examples, the first unison ring assembly 200 can be implemented as the unison ring 125 of FIG. 1. FIG. 2B is a detailed view of a portion of the example first unison ring assembly 200 of FIG. 2A. The example first unison ring assembly 200 includes an example unison ring 202, example brackets 204*a*-204*f*, example inward facing rub buttons 206, example outward facing rub buttons 208*a*-208*f*, and example lever arms 210. The example unison ring 202 includes an example inner annular surface 212 and an example outer annular surface 214. As described in connection with FIG. 1, the inner annular surface 212 faces and surrounds the compressor casing 127. Accordingly, the example outer annular surface 214 faces away from the compressor casing 127. The example brackets 204*a*-204*f* are coupled (e.g., mounted, detachably coupled, etc.) to the compressor casing 127. In other examples, any of the brackets 204*a*-204*f* may be implemented by any other component (e.g., shroud(s), duct(s), fairing(s), etc.) configured to provide external/outward support. The plurality of the example brackets 204*a*-204*f* correspond to an array/plurality of the outward facing rub buttons 208*a*-208*f*. The example outward facing rub buttons 208*a*-208*f* are positioned (e.g., distributed) at different circumferential positions around/on the unison ring 202. In some examples, any of the pairs of corresponding outward facing rub buttons 208*a*-208*f* and brackets 204*a*-204*f* can be positioned at any circumferential position around the unison ring 202. As such, the first unison ring assembly 200 is adjustable based on the size, design, etc., of the compressor casing 127 or the size, design, orientation, etc., of example components that may be adjacent to the compressor casing 127. In some examples, the outward facing rub buttons 208*a*-208*f* can be any load reacting body such as an elongated body, elongated member, pin, etc., extending away from the outer annular surface 214 of the unison ring 202. In the example of FIGS. 2A and 2B, the outward facing rub buttons 208*a*-208*f* are detachable from the unison ring 202 or the first unison ring assembly 200. In other examples, the unison ring 202 includes the outward facing rub buttons 208*a*-208*f*. For example, the outward facing rub buttons 208*a*-208*f* may be integral to or otherwise part of the unison ring 202.

As shown in FIG. 2B, the outward facing rub button 208*a* is positioned at a first circumferential position on the unison ring 202. Further, the example bracket 204*a* is positioned adjacent to the first circumferential position. The example bracket 204*a* includes a first arm 216 (e.g., an external support structure) coupled to/positioned on the compressor casing 127 (FIG. 1), a second arm 218 extending away from the compressor casing 127, and a third arm 220 extending axially away from the second arm 218. The example third arm 220 extends across the outer annular surface 214 of the unison ring 202. As such, the example unison ring 202 is positioned between the third arm 220 and the compressor casing 127.

The example outward facing rub button 208*a* includes a first portion coupled to the unison ring 202. In particular, the first portion of the outward facing rub button 208*a* is positioned in at least one example cavity 222 in the outer annular surface 214 to couple the outward facing rub button 208*a* to the unison ring 202. In other words, the first portion of the example outward facing rub button 208*a* is embedded in the outer annular surface 214. In some examples, the outer annular surface 214 includes a plurality of the cavities 222 spaced circumferentially along the outer annular surface 214. In the example of FIGS. 2A and 2B, the example cavities 222 extend from the outer annular surface 214 through to the inner annular surface 212. However, the outward facing rub buttons 208*a*-208*f* extend partially through the cavities 222 (e.g., between the outer annular surface 214 and the inner annular surface 212). In other examples, the cavities 222 extend only partially into the outer annular surface 214 (towards the inner annular surface 212). In some examples, the outward facing rub buttons 208*a*-208*f* extend (e.g., fully extend, completely extend, etc.) through the cavities 222.

Additionally, the example outward facing rub button 208*a* includes a second portion that extends away from the outer annular surface 214 towards the third arm 220. The second portion of the outward facing rub button 208*a* includes a curved surface/face/portion 224 to contact the third arm 220. In particular, the curved surface 224 and an example surface 226 of the third arm 220 (e.g., facing the unison ring 202) defines an example rubbing interface. Further, the example outward facing rub button 208*a* separates the unison ring 202 from the third arm 220. In particular, the example curved surface 224 of the outward facing rub button 208*a* separates the unison ring 202 from the third arm 220. Similarly, each of the example brackets 204*a*-204*f* and outward facing rub buttons 208*a*-208*f* include such example rubbing interfaces. Accordingly, the outward facing rub buttons 208*a*-208*f* can push/rub/glide on the corresponding brackets 204*a*-204*f* (e.g., the arms of the corresponding brackets 204*a*-204*f*) to counteract mechanical deflection of the unison ring 202, etc.

In some examples, the outward facing rub buttons 208*a*-208*f* include materials such as stainless steel alloys (e.g., A286), nickel alloys (e.g., INCO718), etc. In some examples, the curved surfaces of the outward facing rub buttons 208*a*-208*f*, such as the curved surface 224 of the outward facing rub button 208*a*, can include swaged, non-metallic materials. In some examples, the brackets 204*a*-204*f* include materials such as steel. In some examples, the unison ring 202 includes materials such as aluminum, titanium, 17-4PH, etc.

Figure 3B:
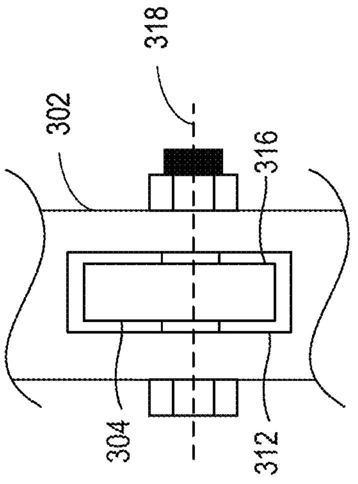
FIG. 3B is a top view of the second unison ring assembly of FIG. 3A.
Figure 3A:
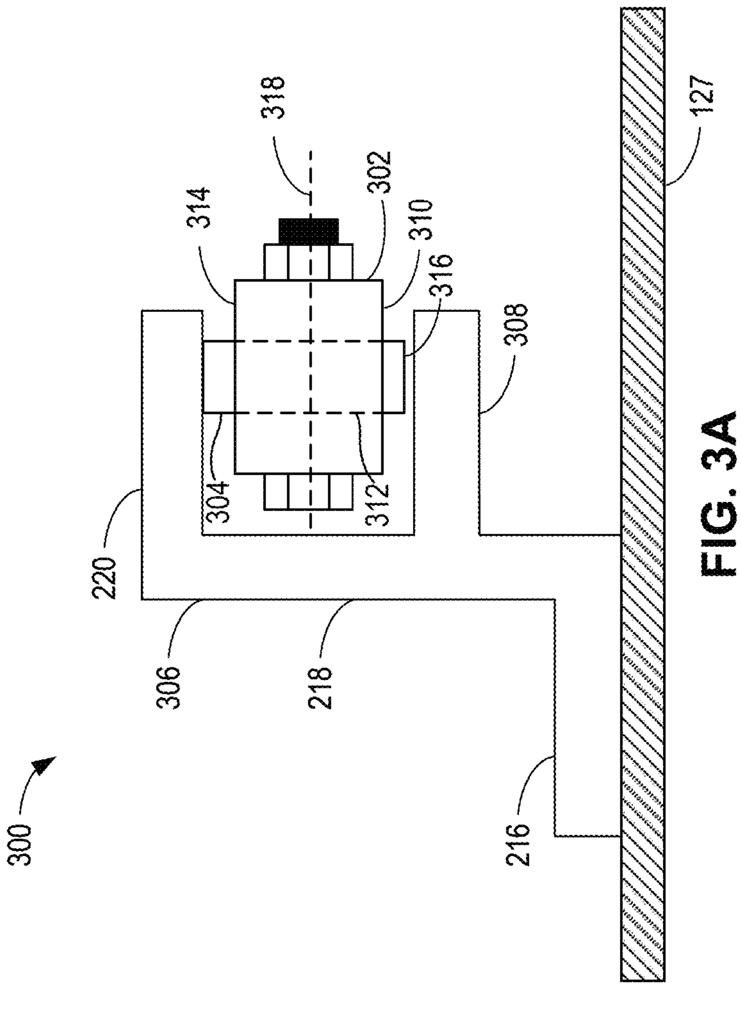
FIG. 3A is a cross-sectional, side view of an example second unison ring assembly constructed in accordance with examples disclosed herein.

FIG. 3A is a cross-sectional, side view of an example second unison ring assembly 300 constructed in accordance with examples disclosed herein. The example second unison ring assembly 300 includes a portion of an example unison ring 302, an example bearing 304, and an example bracket 306. FIG. 3B is a top view of the example unison ring 302 and the example bearing 304. Similar to the example bracket 204*a* of FIGS. 2A and 2B, the example bracket 306 of FIG. 3A includes the first arm 216, the second arm 218, and the third arm 220. However, the example bracket 306 further includes a fourth arm 308 extending across an inner annular surface 310 of the unison ring 302 in an axial direction away from the second arm 218. The example fourth arm 308 is approximately parallel (e.g., within 5 degrees) to the third arm 220. The example inner annular surface 310 of the unison ring 302 faces the compressor casing 127. As such, the fourth arm 308 is positioned between the unison ring 302 and the compressor casing 127.

In the example of FIG. 3B, the bearing 304 is an example load reacting body. The example bearing 304 is positioned in an example cavity 312 of the unison ring 302, the cavity 312 extending through an outer annular surface 314 of the unison ring 302 and the inner annular surface 310. In some examples, the cavity 312 may be included in plurality of example cavities 312 distributed at different circumferential positions on the unison ring 302. The example bearing 304 extends through the unison ring 302 via the cavity 312. Further, the example bearing 304 is positioned between the third arm 220 and the fourth arm 308. The example bearing 304 can contact at least one of the third arm 220 or the fourth arm 308. Similar to the outward facing rub button 208*a* in FIGS. 2A and 2B, the example bearing 304 includes a curved, outer annular surface 316 to facilitate contact with at least one of the third arm 220 or the fourth arm 308. For example, the bearing 304 can contact the third arm 220 in a rolling motion by rotating along an example axis 318. As such, the example second unison ring assembly 300 can ensure that the unison ring 302 is maintained in place by a secure attachment of the bracket 306 to the compressor casing 127 and a rubbing interface provided by the at least one of the arms 220, 308 and the outer annular surface 316 of the bearing 304.

Figure 4B:
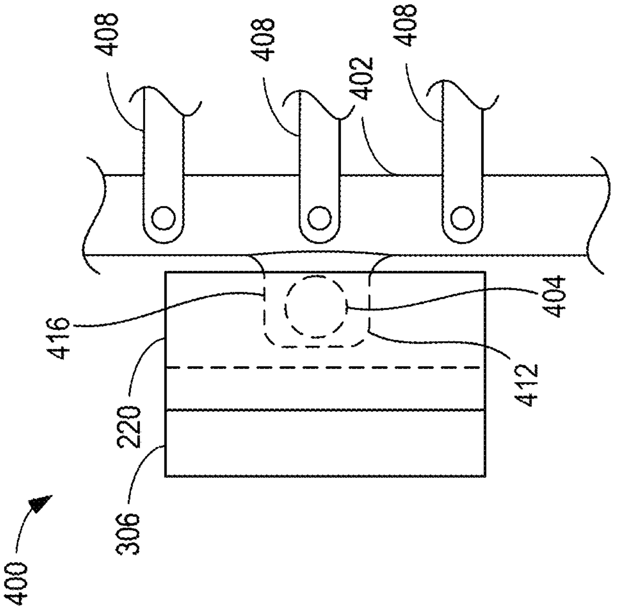
FIG. 4B is a top view of the third unison ring assembly of FIG. 4A.
Figure 4A:
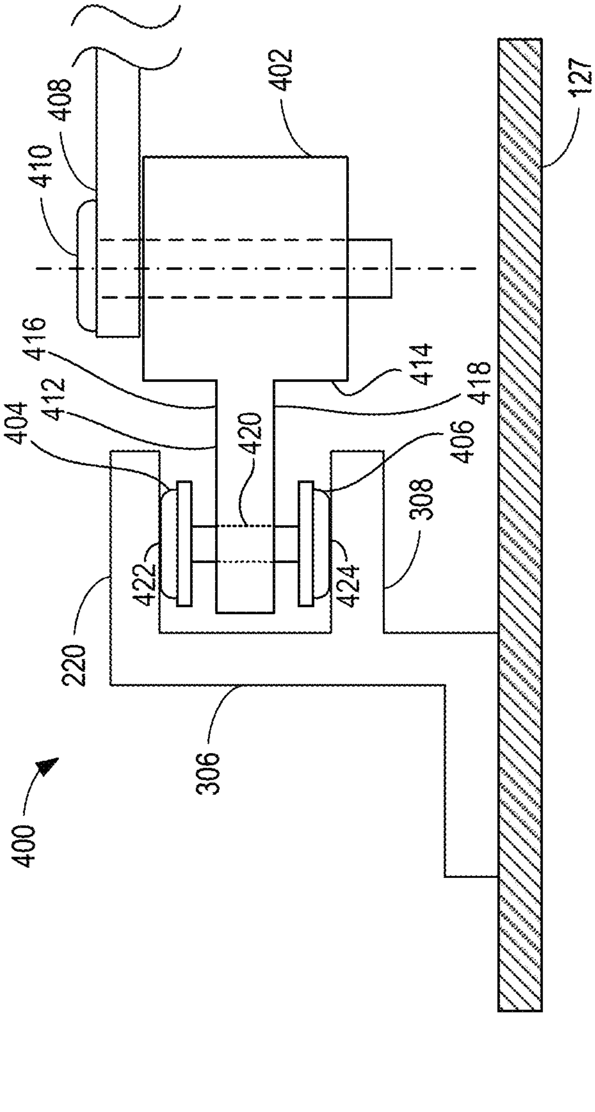
FIG. 4A is a cross-sectional, side view of an example third unison ring assembly constructed in accordance with examples disclosed herein.

FIG. 4A is a cross-sectional, side view of an example third unison ring assembly 400 constructed in accordance with examples disclosed herein. The example third unison ring assembly 400 includes a portion of an example unison ring 402, an outward facing rub button 404, an inward facing rub button 406, an example lever 408, an example lever arm pin 410, and the example bracket 306. FIG. 4B is a top view of the example third unison ring assembly 400. The example unison ring 402 is similar to the example unison ring 202 of FIGS. 2A and 2B. However, the example unison ring 402 includes a tab 412 (e.g., support structure, fifth arm, etc.) that extends from a side 414 of the unison ring 402 towards the bracket 306. The example bracket 306, the rub buttons 404, 406, and the tab 412 are aligned with a first circumferential position on the unison ring 402. In the example of FIG. 4A, the third arm 220 extends across an example first surface 416 of the tab 412, the first surface 416 facing away from the compressor casing 127 (FIG. 1). Further, the fourth arm 308 extends across a second surface 418 of the tab 412, the second surface 418 facing the compressor casing 127. As such, the example fourth arm 308 is positioned between the tab 412 and the compressor casing 127.

The example rub buttons 404, 406 are positioned in an example cavity 420 in the tab 412. In this example, the cavity 420 extends from the first surface 416 of the tab 412 to the second surface 418 of the tab 412. The example outward facing rub button 404 extends from the cavity 420 towards the third arm 220. Further, the example inward facing rub button 406 extends from the cavity 420 towards the fourth arm 308. The example rub buttons 404, 406 include curved faces 422, 424 (e.g., curved surfaces), respectively. The example curved faces 422, 424 contact the third arm 220 and the fourth arm 308, respectively. In some examples, the rub buttons 404, 406 are a rub button assembly, wherein the curved faces 422, 424 are coupled to opposing ends of a cylindrical body. In such examples, the cylindrical body extends through the tab 412 via the cavity 420. The example curved faces 422, 424 separate the tab 412 from the third arm 220 and the fourth arm 308. In turn, the retention of the tab 412 and the rub buttons 404, 406 within the third arm 220 and the fourth arm 308 maintains the spacing and alignment of the compressor casing 127.

Figure 5:
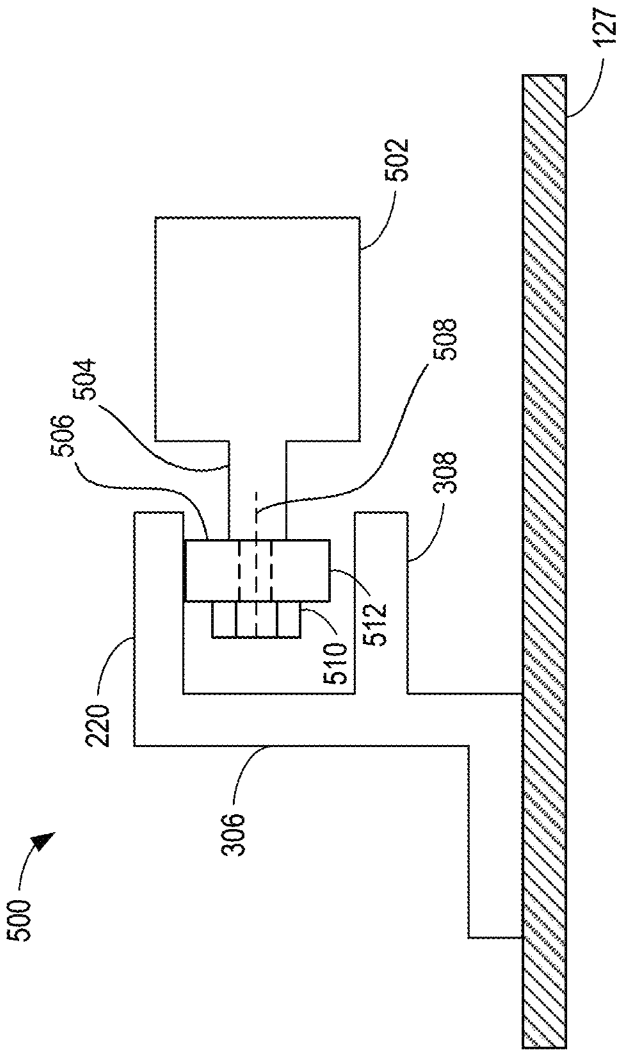
FIG. 5 is a cross-sectional, side view of an example fifth unison ring assembly constructed in accordance with examples disclosed herein.

FIG. 5 is a cross-sectional, side view of an example fourth unison ring assembly 500 constructed in accordance with examples disclosed herein. Similar to the example third unison ring assembly 400 of FIGS. 4A and 4B, the fourth unison ring assembly 500 includes the example bracket 306 and an example unison ring 502 having an example tab 504. Further, the example fourth unison ring assembly 500 includes an example bearing 506 that surrounds an example tab 504. In some examples, the tab 504 includes a generally cylindrical shape. The example bearing 506 can rotate along an axis 508 defined by the tab 504. Further, the example bearing 506 is coupled to the tab 504 via an example fastener 510. As such, the example bearing 506 is coupled to the unison ring 502 via the tab 504. The example bearing 506 of FIG. 5 is similar to the example bearing 304 of FIGS. 3A and 3B in that the example bearing 506 includes an outer annular surface 512 that contacts/rolls along at least one of the third arm 220 or the fourth arm 308. For example, the outer annular surface 512 of the bearing 506 contacts the third arm 220 and the fourth arm 308.

Figure 6:
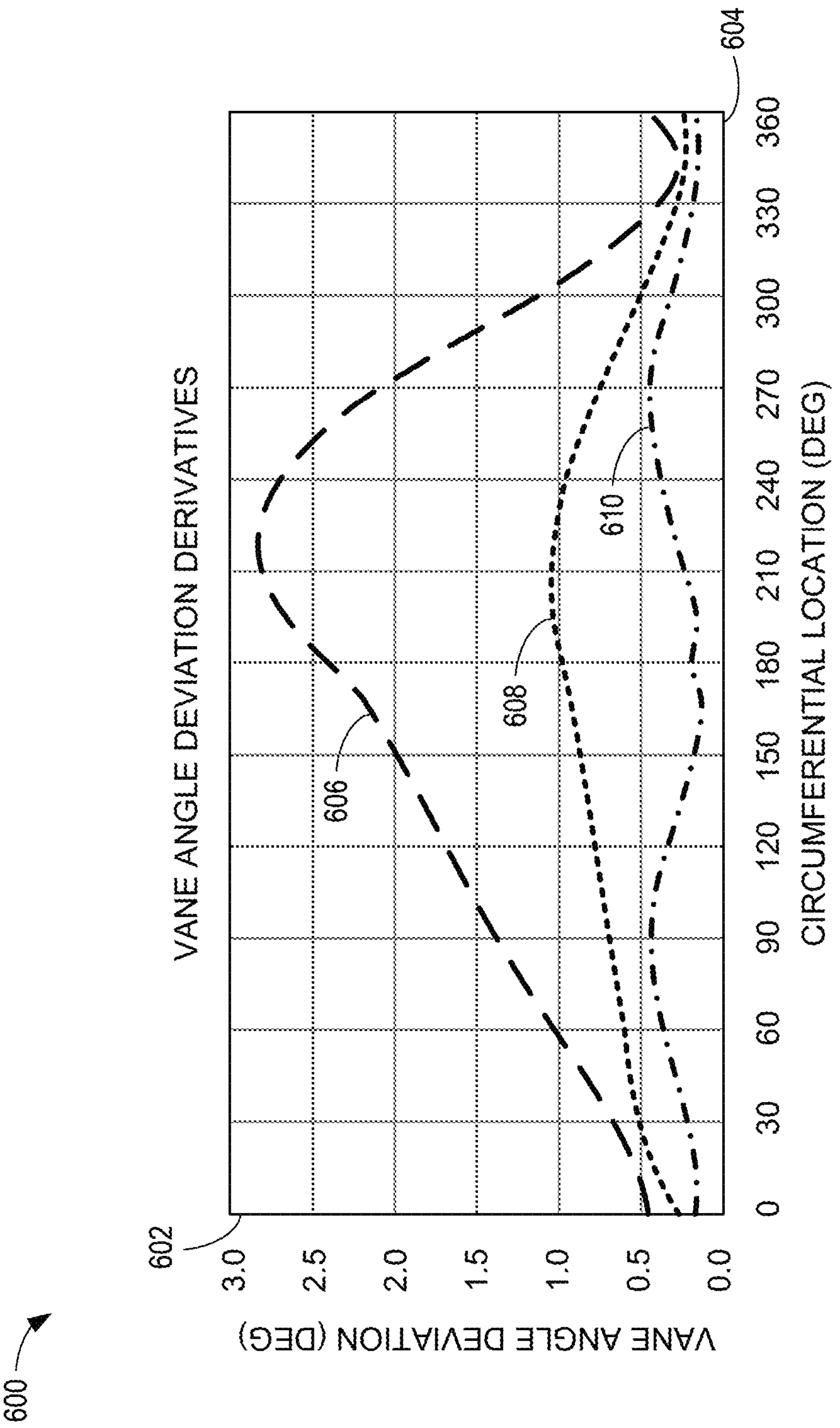
FIG. 6 is an example graph illustrating how vane angle deviation varies as a function of circumferential location on an example unison ring.

FIG. 6 is an example graph 600 illustrating how vane angle deviation (axis 602) varies as a function of circumferential location (axis 604) on an example unison ring. Example plot 606 illustrates how single-actuator systems having only inward facing rub buttons mitigate vane angle deviation along the circumferential locations of an example unison ring. As shown by the plot 606, in a single-actuator system having only inward facing rub buttons, the vane angle deviation can reach as high as 2.7 degrees. Example plot 608 illustrates how single-actuator systems having both inward facing rub buttons and outward facing rub buttons (e.g., the outward facing rub buttons 208*a*-208*f* of FIG. 2A) mitigate vane angle deviation along the circumferential locations of an example unison ring (e.g., the unison ring 202). As shown by the plot 608, in a single-actuator system having inward facing rub buttons and outward facing rub buttons, the deflection of the vane angle deviation remains within 0.3 degrees and 1.2 degrees. As such, the inclusion of outward facing rub buttons (constructed in accordance with the examples of FIGS. 2A and 2B) can reduce vane angle deflection by as much as 44% (e.g., 2.7*0.44=1.2). Example plot 610 illustrates how dual-actuator systems having inward facing rub buttons and outward facing rub buttons (e.g., the outward facing rub buttons 208*a*-208*f* of FIG. 2A) mitigate vane angle deviation along the circumferential locations of an example unison ring (e.g., the unison ring 202). As shown by the plot 610, in a dual-actuator system having inward facing rub buttons and outward facing rub buttons, the vane angle deviation remains within 0.2 degrees and 0.5 degrees.

In some examples, the unison ring assemblies 200, 300, 400, 500 of FIGS. 2A, 3A, 4A, 4B, and 5 include first means for retaining. For example, the first means for retaining may be implemented by any of the unison rings 202, 302, 402, 502 of FIGS. 2A, 3A, 3B, 4A, 4B, and 5.

In some examples, the unison ring assemblies 200, 300, 400, 500 of FIGS. 2A, 3A, 4A, 4B, and 5 include first means for surrounding. For example, the first means for surrounding may be implemented by the compressor casing 127 of FIGS. 1, 3A, 4A, and 5.

In some examples, the unison ring assemblies 200, 300, 400, 500 of FIGS. 2A, 3A, 4A, 4B, and 5 include second means for surrounding. For example, the second means for surrounding may be implemented by the outer annular surface 214 of FIGS. 2A and 2B.

In some examples, the unison ring assemblies 200, 300, 400, 500 of FIGS. 2A, 3A, 4A, 4B, and 5 include first means for supporting. For example, the first means for supporting may be implemented by any one of the brackets 204*a*-204*f* or the bracket 306 of FIGS. 2A, 3A, 4A, 4B, and 5.

In some examples, the unison ring assemblies 200, 300, 400, 500 of FIGS. 2A, 3A, 4A, 4B, and 5 include second means for retaining. For example, the second means for retaining may be implemented by the third arm 220 of FIGS. 2B, 3A, 4A, 4B, and 5.

In some examples, the unison ring assemblies 200, 300, 400, 500 of FIGS. 2A, 3A, 4A, 4B, and 5 include means for reacting to load. For example, the means for reacting to load may be implemented by any one of the outward facing rub buttons 208*a*-208*f*, the bearing 304 the outward facing rub button 404, the bearing 506 of FIGS. 2A, 3A, 3B, 4A, 4B, and 5.

In some examples, the unison ring assemblies 200, 300, 400, 500 of FIGS. 2A, 3A, 4A, 4B, and 5 include first means for contacting. For example, the first means for contacting may be implemented by the curved surface 224, the curved face 422, the outer annular surface 316, or the outer annular surface 512 of FIGS. 2B, 3A, 3B, 4A, and 5.

In some examples, the unison ring assembly 200 of FIGS. 2A and 2B includes first means for receiving. For example, the first means for receiving may be implemented by the cavity 222 of FIG. 2B.

In some examples, the unison ring assemblies 400, 500 of FIGS. 4A, 4B, and 5 include second means for supporting. For example, the second means for supporting may be implemented by the tab 412 or the tab 504 of FIGS. 4A, 4B, and 5.

In some examples, the unison ring assembly 400 of FIGS. 4A and 4B include third means for supporting. For example, the third means for supporting may be implemented by the first surface 416 of FIG. 4A.

In some examples, the unison ring assemblies 300, 400, 500 of FIGS. 3A, 4A, 4B, and 5 include third means for retaining. For example, the third means for retaining may be implemented by the fourth arm 308 of FIGS. 3A, 4A, 4B, and 5.

In some examples, the unison ring assembly 400 of FIGS. 4A and 4B include fourth means for supporting. For example, the fourth means for supporting may be implemented by the second surface 418 of FIG. 4A.

In some examples, the unison ring assembly 400 of FIGS. 4A and 4B include second means for receiving. For example, the second means for receiving may be implemented by the cavity 420 of FIG. 4A.

In some examples, the unison ring assembly 400 of FIGS. 4A and 4B include second means for contacting. For example, the second means for contacting may be implemented by the curved face 424 of FIG. 4A.

In some examples, the unison ring assembly 300 of FIGS. 3A and 3B include third means for receiving. For example, the third means for receiving may be implemented by the cavity 312 of FIGS. 3A and 3B.

In some examples, the unison ring assemblies 200, 300 of FIGS. 2A and 3A include fourth means for surrounding. For example, the fourth means for surrounding may be implemented by the inner annular surface 212 of FIG. 2A or the inner annular surface 310 of FIG. 3A.

From the foregoing, it will be appreciated that example systems, apparatus, articles of manufacture, and methods have been disclosed that mitigate variable stator vane angle deviation in gas turbine engines. For example, disclosed examples provide outward facing load reacting bodies for use with an example unison ring that counteract loads on a compressor casing in an example gas turbine engines. For examples, disclosed examples include external support structures (e.g., brackets) that provide outward radial constraints for the load reacting bodies. Further, disclosed examples can be positioned at any circumferential location on an example unison ring. As such, examples disclosed herein enable positional adjustment of the load reacting bodies on unison rings based on the design, shape, orientation, etc., of example compressor casings. Further, disclosed examples can be implemented in large gas turbine engines having dual actuation systems and smaller gas turbine engines (e.g., having single actuator systems).

Further disclosure is provided by the following clauses:

A unison ring assembly comprising a unison ring surrounding a casing, the unison ring having an outer annular surface facing away from the casing, a bracket coupled to the casing, the bracket having an arm extending across the outer annular surface of the unison ring, the unison ring positioned between the arm and the casing, and an elongated body positioned at a circumferential position on the unison ring, a first portion of the elongated body coupled to the unison ring, a second portion of the elongated body extending away from the outer annular surface of the unison ring, the second portion having a curved surface to contact the arm.

The unison ring assembly of any preceding clause, wherein the elongated body separates the unison ring from the arm.

The unison ring assembly of any preceding clause, wherein the elongated body is a rub button, a portion of the rub button positioned in a cavity in the outer annular surface to couple the rub button to the unison ring.

The unison ring assembly of any preceding clause, wherein the arm is a first arm, further including a tab extending from a side of the unison ring towards the bracket, the tab aligned with the circumferential position, the first arm extending across a first surface of the tab, the first surface of the tab facing away from the casing, and a second arm of the bracket extending across a second surface of the tab, the second surface of the tab facing the casing, the second arm positioned between the tab and the casing.

The unison ring assembly of any preceding clause, wherein the elongated body is a rub button and the curved surface is a first curved surface, a first portion of the rub button positioned in a cavity in the tab, the cavity extending between the first surface of the tab and the second surface of the tab, a second portion of the rub button including the first curved surface, the first curved surface to contact the first arm, a third portion of the rub button having a second curved surface to contact the second arm.

The unison ring assembly of any preceding clause, wherein the outer annular surface is a first outer annular surface, wherein the elongated body is a bearing, and wherein the curved surface is a second outer annular surface of the bearing, the second outer annular surface to contact the first arm or the second arm.

The unison ring assembly of any preceding clause, wherein the outer annular surface is a first outer annular surface, wherein the unison ring includes a cavity extending through the unison ring from the first outer annular surface to a first inner annular surface, wherein the elongated body is a bearing, the bearing extending through the unison ring, and wherein the curved surface is a second outer annular surface of the bearing.

The unison ring assembly of any preceding clause, wherein the arm is a first arm, and wherein the bracket further includes a second arm extending across the first inner annular surface of the unison ring, the second arm positioned between the unison ring and the casing, the second outer annular surface of the bearing to contact at least one of the first arm or the second arm.

The unison ring assembly of any preceding clause, wherein the elongated body is included in a plurality of elongated bodies, the plurality of elongated bodies positioned at different circumferential positions on the unison ring.

The unison ring assembly of any preceding clause, wherein the bracket is included in a plurality of brackets, the plurality of brackets aligned to the plurality of elongated bodies, the plurality of elongated bodies including curved surfaces to contact respective ones of the plurality of brackets.

An apparatus comprising a first support structure coupled to a compressor casing, the first support structure including a first arm extending radially away from the compressor casing, and a second arm extending axially away from the first arm, a second support structure surrounding the compressor casing, the second support structure positioned between the second arm and the compressor casing, and a load reacting body coupled to the second support structure, the load reacting body having a curved portion to contact the second arm, the load reacting body to separate the first support structure from the second support structure.

The apparatus of any preceding clause, wherein the load reacting body is included in an array of load reacting bodies distributed at different locations on the second support structure.

The apparatus of any preceding clause, wherein the load reacting body is a rub button.

The apparatus of any preceding clause, wherein the load reacting body is a bearing.

The apparatus of any preceding clause, wherein the first support structure includes a third arm extending axially away from the first arm, the load reacting body positioned between the second arm and the third arm, the curved portion of the load reacting body to contact the second arm or the third arm.

The apparatus of any preceding clause, wherein the load reacting body is a first load reacting body and the curved portion is a first curved portion, the first load reacting body positioned between the second support structure and the second arm, and further including a second load reacting body positioned between the second support structure and the third arm, the first curved portion to contact the second arm, the second load reacting body having a second curved portion to contact the third arm.

The apparatus of any preceding clause, wherein the second support structure includes a fourth arm extending axially away from the second support structure towards the first support structure, the fourth arm positioned between the second arm and the third arm, the load reacting body coupled to the second support structure via the fourth arm.

The apparatus of any preceding clause, wherein the second arm is approximately parallel to the third arm.

A unison ring comprising an inner annular surface facing a compressor casing, an outer annular surface facing away from the compressor casing, and an elongated body extending away from the outer annular surface, the elongated body having a face to contact an external support structure, the face of the elongated body to separate the external support structure from the outer annular surface.

The unison ring of any preceding clause, wherein the outer annular surface includes a plurality of cavities spaced circumferentially along the outer annular surface, the elongated body positioned in at least one of the plurality of cavities.

The unison ring of any preceding clause, wherein the plurality of cavities extend through the outer annular surface and the inner annular surface, and wherein the external support structure is a first external support structure, the elongated body extending through the at least one of the plurality of cavities, the elongated body to contact at least one of the first external support structure or a second external support structure, the second external support structure positioned between the inner annular surface and the compressor casing.

A unison ring assembly comprising first means for retaining a first means for surrounding, the first means for retaining having a second means for surrounding facing away from the first means for surrounding, a first means for supporting coupled to the first means for surrounding, the first means for supporting having a second means for retaining extending across the second means for surrounding of the first means for retaining, the first means for retaining positioned between the second means for retaining and the first means for surrounding, and means for reacting to load positioned at a circumferential position on the first means for retaining, a first portion of the means for reacting to load coupled to the first means for retaining, a second portion of the means for reacting to load extending away from the second means for surrounding of the first means for retaining, the second portion having a first means for contacting to contact the second means for retaining.

The unison ring of any preceding clause, wherein the means for reacting to load separates the first means for retaining from the second means for retaining.

The unison ring of any preceding clause, wherein the means for reacting to load is a rub button, the first portion of the rub button positioned in first means for receiving in the second means for surrounding to couple the rub button to the first means for retaining.

The unison ring of any preceding clause, further including second means for supporting extending from a side of the first means for retaining towards the first means for supporting, the second means for supporting aligned with the circumferential position, the second means for retaining extending across a third means for supporting of the second means for supporting, the third means for supporting facing away from the first means for surrounding, and third means for retaining of the first means for supporting extending across a fourth means for supporting of the second means for supporting, the fourth means for supporting facing the first means for surrounding, the third means for retaining positioned between the second means for supporting and the first means for surrounding.

The unison ring of any preceding clause, wherein the means for reacting to load is a rub button, the first portion of the rub button positioned in a second means for receiving in the second means for supporting, the second means for receiving extending between the first surface of the second means for supporting and the second surface of the second means for supporting, the second portion of the rub button including the first means for contacting, the first means for contacting to contact the second means for retaining, a third portion of the rub button having second means for contacting to contact the third means for retaining.

The unison ring of any preceding clause, wherein the means for reacting to load is a bearing, wherein the bearing includes first means for contacting to contact the second means for retaining or the third means for retaining.

The unison ring of any preceding clause, wherein the first means for retaining includes third means for receiving to extend through the first means for retaining from the second means for surrounding to a fourth means for surrounding, the means for reacting to load extending through the first means for retaining, the means for reacting to load including the first means for contacting to contact the second means for retaining.

The unison ring of any preceding clause, wherein the first means for supporting further includes a third means for retaining extending across the fourth means for surrounding of the first means for retaining, the third means for retaining positioned between the first means for retaining and the first means for surrounding, the second outer annular surface of the bearing to contact at least one of the second means for retaining or the third means for retaining.

The unison ring of any preceding clause, wherein the means for reacting to load is included in a plurality of means for reacting to load, the plurality of means for reacting to load positioned at different circumferential positions on the first means for retaining.

The unison ring of any preceding clause, further including multiple ones of the first means for supporting, the multiple ones of the first means for supporting aligned to the plurality of means for reacting to load, the plurality of means for reacting to load including first means for contacting to contact respective ones of the first means for supporting.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed:

1. A unison ring assembly, comprising:

a unison ring surrounding a casing, the unison ring having an outer annular surface facing away from the casing;

a bracket coupled to the casing, the bracket having a first arm extending across the outer annular surface of the unison ring, the unison ring positioned between the first arm and the casing, wherein the bracket further includes a second arm extending radially from the first arm and a third arm extending axially away from the second arm, the third arm extending in a direction opposite from the first arm; and an elongated body positioned at a circumferential position on the unison ring, a first portion of the elongated body coupled to the unison ring, a second portion of the elongated body extending away from the outer annular surface of the unison ring, the second portion having a curved surface to contact the first arm.

2. The unison ring assembly of claim 1, wherein the elongated body separates the unison ring from the first arm.

3. The unison ring assembly of claim 1, wherein the elongated body is a rub button, a portion of the rub button positioned in a cavity in the outer annular surface to couple the rub button to the unison ring.

4. The unison ring assembly of claim 1, wherein the first arm includes:

a tab extending from a side of the unison ring towards the bracket, the tab aligned with the circumferential position, the first arm extending across a first surface of the tab, the first surface of the tab facing away from the casing; and a fourth arm of the bracket extending across a second surface of the tab, the second surface of the tab facing the casing, the fourth arm positioned between the tab and the casing.

5. The unison ring assembly of claim 4, wherein the elongated body is a rub button and the curved surface is a first curved surface, a first portion of the rub button positioned in a cavity in the tab, the cavity extending between the first surface of the tab and the second surface of the tab, a second portion of the rub button including the first curved surface, the first curved surface to contact the first arm, a third portion of the rub button having a second curved surface to contact the fourth arm.

6. The unison ring assembly of claim 4, wherein the outer annular surface is a first outer annular surface, wherein the elongated body is a bearing, and wherein the curved surface is a second outer annular surface of the bearing, the second outer annular surface to contact the first arm or the fourth arm.

7. The unison ring assembly of claim 1, wherein the outer annular surface is a first outer annular surface, wherein the unison ring includes a cavity extending through the unison ring from the first outer annular surface to a first inner annular surface, wherein the elongated body is a bearing, the bearing extending through the unison ring, and wherein the curved surface is a second outer annular surface of the bearing.

8. The unison ring assembly of claim 7, wherein the bracket further includes a fourth arm extending across the first inner annular surface of the unison ring, the fourth arm positioned between the unison ring and the casing, the second outer annular surface of the bearing to contact at least one of the first arm or the fourth arm.

9. The unison ring assembly of claim 1, wherein the elongated body is included in a plurality of elongated bodies, the plurality of elongated bodies positioned at different circumferential positions on the unison ring.

10. The unison ring assembly of claim 9, wherein the bracket is included in a plurality of brackets, the plurality of brackets aligned to the plurality of elongated bodies, the plurality of elongated bodies including curved surfaces to contact respective ones of the plurality of brackets.

11. An apparatus, comprising:

a first support structure coupled to a compressor casing, the first support structure including:
- a first arm extending radially away from the compressor casing;
- a second arm extending axially away from the first arm; and
- a third arm extending axially away from the second arm, the third arm extending in a direction opposite from the first arm;

a second support structure surrounding the compressor casing, the second support structure positioned between the second arm and the compressor casing; and a load reacting body coupled to the second support structure, the load reacting body having a curved portion to contact the second arm, the load reacting body to separate the first support structure from the second support structure.

12. The apparatus of claim 11, wherein the load reacting body is included in an array of load reacting bodies distributed at different locations on the second support structure.

13. The apparatus of claim 11, wherein the load reacting body is a rub button.

14. The apparatus of claim 11, wherein the load reacting body is a bearing.

15. The apparatus of claim 11, wherein the load reacting body is positioned between the second arm and the third arm, the curved portion of the load reacting body to contact the second arm or the third arm.

16. The apparatus of claim 15, wherein the load reacting body is a first load reacting body and the curved portion is a first curved portion, the first load reacting body positioned between the second support structure and the second arm, and further including a second load reacting body positioned between the second support structure and the third arm, the first curved portion to contact the second arm, the second load reacting body having a second curved portion to contact the third arm.

17. The apparatus of claim 15, wherein the second support structure includes a fourth arm extending axially away from the second support structure towards the first support structure, the fourth arm positioned between the second arm and the third arm, the load reacting body coupled to the second support structure via the fourth arm.

18. A unison ring, comprising:

an inner annular surface facing a compressor casing;

an outer annular surface facing away from the compressor casing;

an elongated body extending away from the outer annular surface, the elongated body having a face to contact an external support structure, the face of the elongated body to separate the external support structure from the outer annular surface;

a first arm extending radially away from the compressor casing;

a second arm extending axially away from the first arm; and a third arm extending axially away from the second arm, the third arm extending in a direction opposite from the first arm.

19. The unison ring of claim 18, wherein the outer annular surface includes a plurality of cavities spaced circumferentially along the outer annular surface, the elongated body positioned in at least one of the plurality of cavities.

20. The unison ring of claim 19, wherein the plurality of cavities extend through the outer annular surface and the inner annular surface, and wherein the external support structure is a first external support structure, the elongated body extending through the at least one of the plurality of cavities, the elongated body to contact at least one of the first external support structure or a second external support structure, the second external support structure positioned between the inner annular surface and the compressor casing.

* * * * *